UNITED STATES PATENT OFFICE.

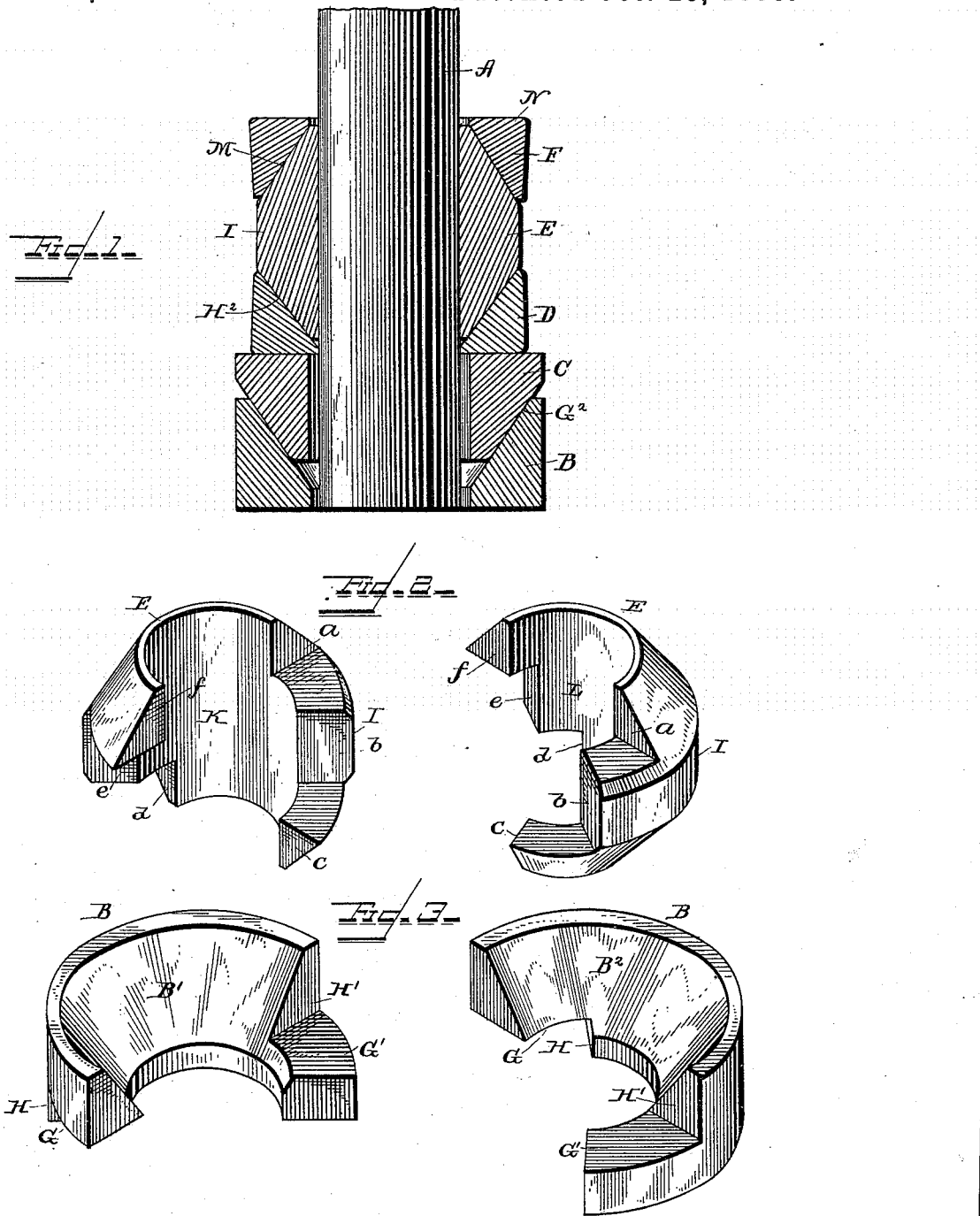

BYRON E. FOSS, OF INDIANAPOLIS, INDIANA.

PISTON-ROD AND VALVE-STEM PACKING.

SPECIFICATION forming part of Letters Patent No. 351,695, dated October 26, 1886.

Application filed July 24, 1886. Serial No. 208,965. (No model.)

*To all whom it may concern:*

Be it known that I, BYRON E. FOSS, a citizen of the United States, residing at Indianapolis, in the county of Marion and State of Indiana, have invented certain new and useful Improvements in Piston-Rod Packing and Valve-Stem Packing; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of my invention, and is a sectional view of the same. Fig. 2 is a detail view of the ring E. Fig. 3 is a detail view of the ring B.

My invention relates to piston-rod packing and valve-stem packing; and it consists in the construction and novel combination of parts, as hereinafter described, and pointed out in the claims.

The object of the invention is to provide a packing that can be used in any part of any kind of an engine that requires packing; but for convenience in describing and illustrating the construction of the packing, I will confine it to a piston-rod packing.

Referring by letter to the accompanying drawings, A designates the piston-rod, which extends through the central openings of the sectional and solid rings which form the packing proper.

The rings B C, I term the "first division," and the rings D E F, I term the "second division," of the piston-rod packing. The sectional-ring B is provided with rabbets or shoulders G G' at the ends of the sections B' B² of said ring B, the rabbets G being formed in the outer or plain faces, H, of the sections B' B², and the rabbets G' being formed in the inner or tapering faces, H', of the said sections B' B² of the ring B, and when the two sections B' B² are in place on the piston-rod they form a sectional ring having a plain outer face and an inclined or inwardly-beveled inner face. Next to the sectional ring B, I place a solid ring, C, which is provided with an outwardly-beveled face, G², which fits into the inner beveled or inclined face of the ring B, the rear face of the said solid ring C being made plain. Next to the solid ring C, I place a smaller solid ring, D, which has its outer face made plain and its inner face, H², beveled inwardly to receive one beveled face of the sectional ring E. The ring E has a middle plain portion, I, and the remainder of the outer surface is beveled downwardly and outwardly at each side of said middle plain portion, I. The ends of the sections K L of the ring E are provided with shoulders *a b c* and *d e f*, and when the sections K L of this ring are brought together on the piston-rod they meet and fit together and form the completed ring. Next to this ring E, I place the fifth and last ring, F, which is provided with an internal beveled face, M, and a front or external plain face, N.

The two rings B C are of equal diameters and are larger than the three rings D E F, the latter three rings having diameters alike in length.

The ring E is made of elastic material, so that it will expand and fill the stuffing-box steam-tight, and the rings B and C also fill the stuffing-box steam-tight.

The rings C and D have ground joints, in order to let the piston-rod play up and down or sidewise when operated, as it is necessary that the piston-rod must have play, especially up and down. The joints are cut so as to stand open when the rings are new, and the longer the packing runs the closer the joints come together. This construction enables the packing to pack itself, which saves the engineer the trouble of taking the packing out every few days to pack his engine.

Having described this invention, what I claim, and desire to secure by Letters Patent, is—

1. The combination, with the piston-rod or valve-stem, of the sectional metal ring B, the sectional elastic ring E, and the solid rings C D F, having the plain and beveled faces, substantially as specified.

2. The combination, with the piston-rod, of the solid and sectional metal rings and the sectional elastic ring, said rings being provided with beveled and plain faces and fitted upon the piston-rod within the stuffing-box, substantially as specified.

In testimony whereof I affix my signature in presence of two witnesses.

B. E. FOSS.

Witnesses:
 WM. JANES,
 R. A. SPRAGUE.